Patented June 27, 1944

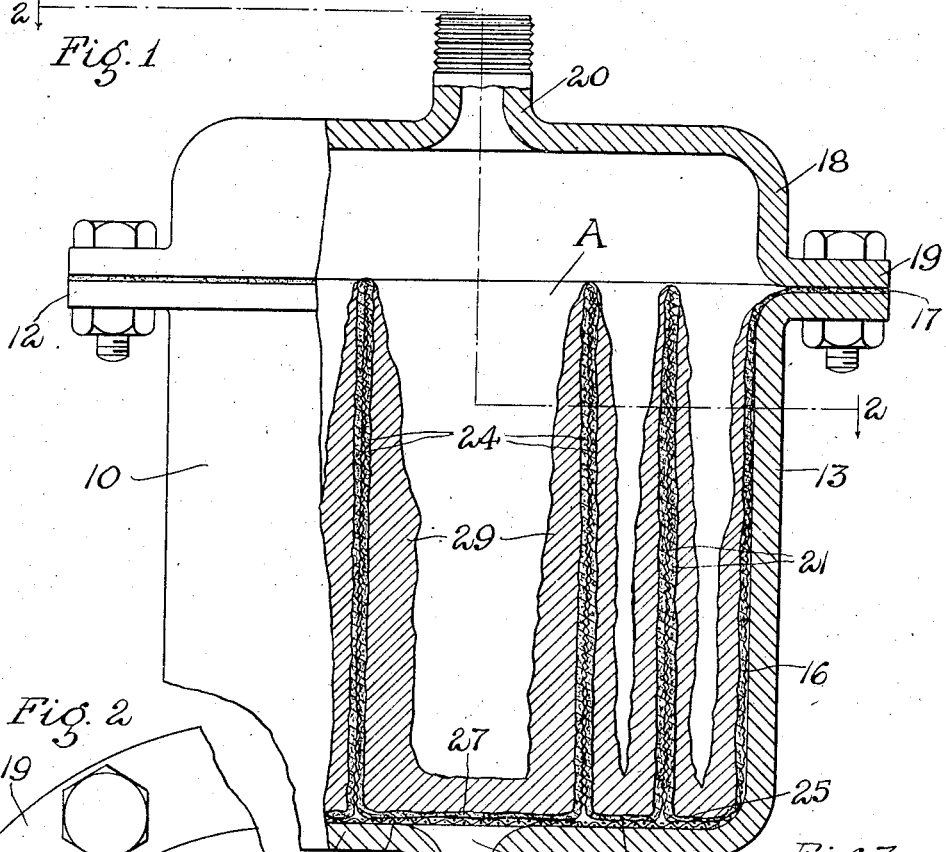
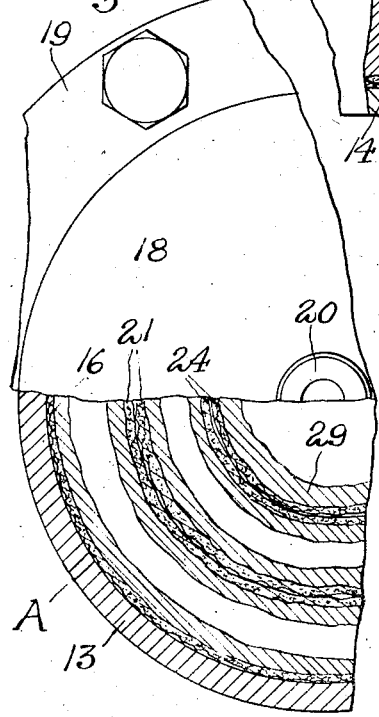
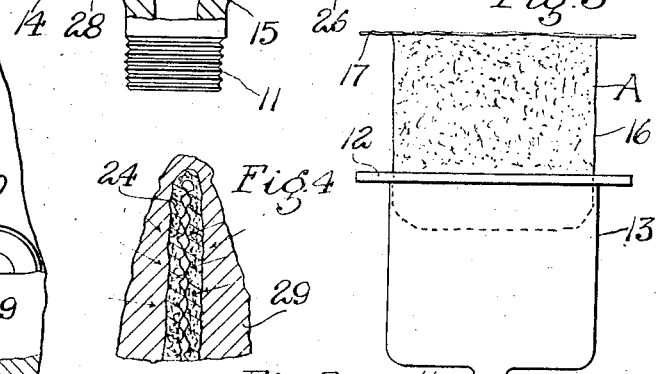
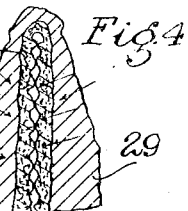
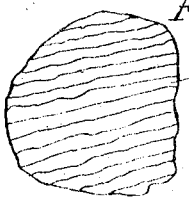

2,352,300

UNITED STATES PATENT OFFICE 2,352,300

FILTER ELEMENT

Earl C. Walker, Altadena, Calif., and Foster Buck, Lisle, Ill., assignors to International Harvester Company, a corporation of New Jersey Original application September 27, 1938, Serial No. 231,954. Divided and this application July 9, 1943, Serial No. 494,096

7 Claims. (Cl. 210—169)

This invention relates to filters and particularly to oil filters for use in connection with an automotive internal combustion engine. The present application is a division of our copending application Serial No. 231,954, filed September 27, 1938, for Filter elements.

Attempts have been made to use replaceable filters made of paper or similar material which could be cheaply made whereby they could be discarded and replaced at frequent intervals. Difficulties have been encountered, however, which have not been solved by elements satisfactory to function in a satisfactory manner for the desired length of time.

The object of the present invention is to provide a filter of molded material such, for example, as fiber used in filter paper construction of a design satisfactory for use in a filter of the automotive type.

Another object is to provide such a filter having an extensive area in a relatively small casing whereby oil may be filtered at a sufficient rate and whereby the life of the filter is sufficient to meet requirements.

Another object is to provide a filter of relatively thin fibrous composition which is so constructed that it is self-supporting to resist a substantial filtration pressure differential.

These and other objects which will be apparent from the detailed description to follow are attained by the construction such as shown in the drawing, wherein:

Figure 1 is a cross sectional view showing a casing in which an element of the cylindrical type is mounted;

Figure 2 is a partial plan view and partial section taken on the line 2—2 of Figure 1;

Figure 3 is an elevation, on a reduced scale, showing the removal of a filter element from its casing;

Figure 4 is an enlarged view of a portion of the element near one of the folds to show the spacing projections and the path of the oil during filtration; and Figure 5 is an elevation of an inside roughened wall portion of the filter element.

Referring to Figure 1, an open top cylindrical casing 10 is provided with an outlet 11 at the bottom and an outwardly extending flange 12 at the top. The casing has a cylindrical interior wall 13 and a flat bottom wall 14, an outlet conduit 15 communicating with the bottom wall at the center thereof. A filter element A is shaped to fit in the casing 10 with an outer cylindrical wall 16 lying closely adjacent the wall 13. A flange 17 integrally formed with the wall 16 is adapted to extend outwardly over the flange 12. A cover 18 having an outwardly extending flange 19 mating with the flange 12 forms a closure for the casing. An inlet 20 in the cover 18 provides means for delivering oil to be filtered under pressure to the casing 10.

As illustrated in the drawing, the element A includes two upwardly extending double cylindrical wall portions 21 and 24 integral with each other and with annular bottom portions 25, 26, and a circular bottom portion 27. These wall portions, as 21, are tubular hollow-wall structures or envelopes having an annular outlet or discharge passage at their junction with the base portions 25, 26, and 27. Consequently, these annular outlets may be considered either as in the lower ends of the tubular wall structures or in the base made up of the portions 25, 26, and 27. It is to be understood that any number of the vertically extending double wall portions 21 and 24 may be utilized. A screen 28 is shown resting on the bottom 14 of the casing. This screen is positioned to support the circular portion 27 against oil pressure within the casing during filtration and to provide a flow passage for filtered oil from the double wall portions 21 and from the casing wall.

The filter element A may be constructed of any fibrous material having a surface which is corrugated, roughened, or otherwise of a nature to allow oil to pass between two adjacent layers or between a layer and a wall of the casing. As illustrated on an enlarged scale in Figures 4 and 5, the material of the element is shown as being provided with spacing means formed as a plurality of small corrugations to provide space for and to enhance the flow of filtered liquid downwardly between the contacting walls. The concentric upstanding double wall portions 21 and 24 are spaced from the casing wall portion and from each other to provide annular spaces sufficient to hold an amount of sludge, slime, and other filtered particles which accumulate during normal life of the filter. To illustrate the depositing of material filtered out during operation, sludge 29 has been indicated along the exterior sides of the upstanding concentric hollow-wall portions of the filter element.

When the filter element has reached the end of its effective life or when the number of hours of filtration has been reached after which a change is to be made, the top 18 of the casing is removed and the filter element A is taken from the casing by grasping the flange 17 around the edge as illustrated in Figure 3. Said flange is not coated with material filtered out during operation so that the entire element containing the filtered-out material may be removed en masse and discarded without contacting or disturbing the sludge and without any required cleaning or any possibility of contaminating the casing or the system with the sludge. A new element may be readily inserted in the casing for continued operation. As the filter is constructed to be supported against pressure by the casing, and where adjacent walls are formed to be supported by transmitting pressure, one against the other, any conventional oil filter pressure may be utilized with a relatively fragile fibrous element without any danger of rupturing the element which would allow impurities to pass therethrough and practically render the filter inoperative.

While the single embodiment herein shown is thought to clearly illustrate the invention, it should be understood that the invention extends to other forms, arrangements, structures, and details falling within the scope and spirit thereof and not sacrificing all of its material advantages.

What is claimed is:

1. A liquid filtering unit comprising a base portion having passage means for the discharge of filtered liquid from the unit; and a tubular filter structure projecting endwise from said base portion for immersion in a body of liquid to be filtered and including thin supple porous laterally-deflectable, contiguously-opposed inner and outer self-supporting filter walls enveloping a zone therebetween for the reception of filtered liquid and extending to the base end of said structure where it is communicative with said discharge passage means, said walls being operable to pass and filter liquid from said body into said zone when the unit pressure of said liquid body on the outer sides of said walls sufficiently exceeds the unit pressure within said zone; and supple surface contouring means upon the inner side of at least one of said walls to react against the wall opposed thereto in opposition to the force exerted by the liquid body upon the outer sides of said walls, to limit collapse of said zone and the degree of constriction of its communication with the discharge passage means.

2. A liquid filtering unit comprising a shell-like hollow wall structure having an outlet opening and including thin supple porous laterally-deflectable, contiguously-opposed inner and outer side walls for immersion in a liquid and enclosing a zone therebetween, the porosity of said walls being such as to pass and filter said liquid inwardly therethrough when the unit pressure of such liquid upon the outer sides of said walls sufficiently exceeds the unit pressure within the zone between said walls, the inner and opposed sides of said walls being pressable into contact each with the other for mutual reaction against the force imposed by the liquid upon the outer and opposite sides thereof, and supple interstice forming means permanently united with and distributed over the inner side of at least one of said walls to cooperate with the inner side of the other wall in forming interstitial drainage passages through which the filtered liquid can reach said outlet opening while the side walls are pressed together as aforesaid.

3. A liquid filtering unit comprising an envelope having an outlet opening and including thin supple porous, laterally-deflectable, contiguously-opposed filter side walls for immersion in a liquid that is filterable inwardly through said walls into a zone defined therebetween when the unit pressure of such liquid upon the outer sides thereof sufficiently exceeds the unit pressure within said zone, said side walls possessing sufficient inherent strength for self-support in their contiguous relation when not subjected to such pressure of the liquid, the inner sides of said walls being pressable together for mutual reaction against the force imposed by the liquid upon the outer sides thereof, and the inner side of at least one of said walls being rough and thus cooperable with the inner side of the other wall in providing interstitial drainage passages through which the filtered liquid can reach the outlet opening.

4. A liquid filtering unit comprising a hollow-wall structure having an outlet opening and including thin supple porous laterally-deflectable walls having outer and inner surfaces of which the latter are contiguously opposed to envelop a filtered-fluid-receiving zone within said wall structure, said hollow-wall structure being immersible in a liquid wherein said walls because of their porosity serve to pass the liquid inwardly therethrough when a sufficient pressure differential exists between that pressure of the liquid against the outer sides of said walls and that pressure within the zone between said walls, the inner and opposed sides of said walls being pressable into contact each with the other for mutual reaction against the force imposed by the liquid upon the outer sides thereof, and supple interstice-forming means permanently associated with and distributed over the inner side of at least one of said walls to cooperate with the inner side of the other wall in forming interstitial drainage passages through which the filtered liquid can reach the outlet opening, and said passages having a combined flow capacity exceeding the combined flow capacity of the pores in said walls to provide for escape of filtered liquid to the outlet opening at a rate precluding back pressure in the zone between the walls attaining a magnitude that would neutralize said pressure differential.

5. A hollow-wall filter element including opposed filtering walls enclosing a thin filtered-liquid-receiving zone provided with an outlet opening and for operation with said walls in a collapsed condition wherein their opposed interior surfaces are pressed together by the pressure of an unfiltered liquid upon their exterior surfaces, said walls being porous to render them operable for filtering said liquid by passing it from their exterior surfaces inwardly therethrough into said zone under the force of said pressure, said walls also being self-supporting though being thin supple laterally-deflectable and correspondingly-contoured to cause such walls to assume the aforesaid collapsed condition wherein they are operable to react inwardly each against the other to prevent their rupture by the pressure of the unfiltered liquid, and supple interstice-forming means upon and distributed over the interior surface of at least one of said walls to cooperate with the opposed interior surface of the other wall in forming interstitial drainage passages through which the filtered liquid can reach said outlet opening.

6. A filter element comprising a filtering hollow-wall structure having a thin liquid-receiving zone therein and immersible in and collapsible by a liquid to be filtered while passing such liquid inwardly through its walls into said thin zone and also having an outlet opening for the discharge of the filtered liquid from said zone, said wall structure including thin supple porous self-supporting, laterally-deflectable, correspondingly-contoured walls having interior and exterior surfaces of which the former are disposed oppositely and of which surfaces the latter are contiguously opposed at opposite sides of said thin zone, said porous walls being operable to filter and pass the unfiltered liquid inwardly therethrough as aforesaid upon the existence of a sufficient predominance of pressure of the unfiltered liquid over the pressure in said space, the interior surfaces of said walls because of their aforesaid laterally-deflectable character being pressable into contact each with the other for mutual reaction against the force applied oppositely upon the oppositely disposed exterior wall and to prevent rupture thereof by the predominant pressure of the unfiltered liquid, and supple porous interstice-forming means upon and distributed over the interior surface of at least one of said walls to cooperate with the opposed interior surface in forming interstitial drainage passages through which the filtered liquid can reach said outlet opening.

7. For use in a filter casing containing a liquid to be filtered and having an outlet opening for filtering of such liquid and an inlet opening for replenishing the unfiltered liquid, a liquid filtering unit comprising a hollow-wall structure including thin, supple, porous, self-supporting, laterally-deflectable, correspondingly-contoured walls enclosing a thin filtered-liquid-receiving zone therebetween and having interior and exterior surfaces of which the former are disposed oppositely and of which the latter are contiguously opposed at opposite sides of said zone, said unit having an outlet opening for said space and being mountable in the casing to block direct communication between the inlet and outlet casing openings, with the outlet opening for said zone communicative with the casing outlet opening and with the exterior wall surfaces immersed in the unfiltered liquid, said porous walls being operable to filter the unfiltered liquid by passing it therethrough into said thin zone upon the existence of a sufficient predominance of pressure in the unfiltered liquid over the pressure in said zone, the interior surfaces of said walls because of their aforesaid laterally-deflectable character being pressable into contact each with the other for mutual reaction against the force applied oppositely upon the oppositely disposed exterior wall surfaces by the predominant pressure of the unfiltered liquid, and supple interstice-forming means associated with and distributed over the interior surface of at least one of said walls to cooperate with the opposed interior surface in forming interstitial drainage passages through which the filtered liquid can reach said outlet openings.

EARL C. WALKER.
FOSTER BUCK.

CERTIFICATE OF CORRECTION.

Patent No. 2,352,300. June 27, 1944.

EARL C. WALKER, ET AL.

It is hereby certified that error appears in the printed specification of the above numbered patent requiring correction as follows: Page 3, first column, line 28, claim 7, for the word "filtering" read --filtered--; and that the said Letters Patent should be read with this correction therein that the same may conform to the record of the case in the Patent Office.

Signed and sealed this 26th day of September, A. D. 1944.

Leslie Frazer (Seal)

Acting Commissioner of Patents.